US012444011B2

(12) United States Patent
Nelson et al.

(10) Patent No.: US 12,444,011 B2
(45) Date of Patent: Oct. 14, 2025

(54) PIN ENTRY DEVICE WITH SECURE SURVEY FUNCTIONALITY

(71) Applicant: TRURATING LIMITED, St. Albans (GB)

(72) Inventors: Georgina Nelson, London (GB); Peter Salmon, Haslemere (GB)

(73) Assignee: TRURATING LIMITED, St. Albans (GB)

( * ) Notice: Subject to any disclaimer, the term of this patent is extended or adjusted under 35 U.S.C. 154(b) by 0 days.

(21) Appl. No.: 18/501,533

(22) Filed: Nov. 3, 2023

(65) Prior Publication Data
US 2024/0062324 A1   Feb. 22, 2024

Related U.S. Application Data

(63) Continuation of application No. 15/523,845, filed as application No. PCT/GB2015/053292 on Nov. 2, 2015, now Pat. No. 11,836,820.

(30) Foreign Application Priority Data

Nov. 3, 2014   (GB) ..................................... 1419547

(51) Int. Cl.
*G06Q 40/00*   (2023.01)
*G06Q 20/20*   (2012.01)
(Continued)

(52) U.S. Cl.
CPC ......... *G06Q 50/265* (2013.01); *G06Q 20/202* (2013.01); *G06Q 20/206* (2013.01);
(Continued)

(58) Field of Classification Search
CPC .. G06Q 50/265; G06Q 20/202; G06Q 20/206; G06Q 20/208; G06Q 20/40
See application file for complete search history.

(56) References Cited

U.S. PATENT DOCUMENTS 8,510,193 B2   8/2013  Levy
9,251,540 B1*  2/2016  Magee ................. G07F 19/206
(Continued)

FOREIGN PATENT DOCUMENTS

CN    1465022 A    12/2013
GB    2456346 A    7/2009
(Continued)

OTHER PUBLICATIONS

Chourasia: "Authentication of the User By Keystroke Dynamics for Banking Transaction System", Proceedings of International Conference on Advances in Engineering & Technology, Apr. 20, 2014, Goa, India, ISBN: 978-93-84209-06-3 (Year: 2014).*
(Continued)

*Primary Examiner* — Edward J Baird
(74) *Attorney, Agent, or Firm* — Cowan, Liebowitz & Latman, P.C.; Mark Montague (57) ABSTRACT

The system includes a PIN entry device (PED) for electronic Point of Sale (EPOS) transactions and enhanced security for consumer survey processing. In addition to the usual PED functionality and financial transaction processing, the system allows feedback from a user to be obtained in response to a question. The system displays a text to the user on a display, and prompts a response from the user. The displayed text is determined to be either an approved text (i.e., part of financial transaction) or an unapproved text (i.e., a response to consumer survey). The system and PED are configured to accept responses entered by the user in response to the approved text, and to accept only a single key press response when prompted by a display of the unapproved text, limiting or avoiding a possibility of fraudulently extracting user PIN through consumer survey questions.

25 Claims, 3 Drawing Sheets

(51) Int. Cl.
    *G06Q 20/40*     (2012.01)
    *G06Q 30/0203*     (2023.01)
    *G06Q 50/26*     (2012.01)
    *G07F 7/08*     (2006.01)

(52) U.S. Cl.
    CPC ........... *G06Q 20/208* (2013.01); *G06Q 20/40* (2013.01); *G06Q 20/4012* (2013.01); *G06Q 20/4014* (2013.01); *G06Q 30/0203* (2013.01); *G07F 7/0886* (2013.01)

(56) References Cited

U.S. PATENT DOCUMENTS

| | | | |
|---|---|---|---|
| 2004/0064406 | A1 | 4/2004 | Yates |
| 2005/0259080 | A1* | 11/2005 | Cole .................. G06F 3/04895 345/168 |
| 2009/0067604 | A1 | 3/2009 | Apple |
| 2009/0271246 | A1 | 10/2009 | Alvarez et al. |
| 2010/0115114 | A1* | 5/2010 | Headley .................. H04L 51/52 709/229 |
| 2010/0299265 | A1 | 11/2010 | Walters et al. |
| 2011/0199308 | A1* | 8/2011 | Nativel .................. G06Q 20/18 345/168 |
| 2011/0211219 | A1 | 9/2011 | Bradley et al. |
| 2011/0307403 | A1* | 12/2011 | Rostampour ........ G06Q 50/265 705/325 |
| 2012/0047071 | A1* | 2/2012 | Mullen .............. G06Q 20/3415 235/492 |
| 2012/0116846 | A1 | 5/2012 | Levy et al. |
| 2012/0143706 | A1 | 6/2012 | Crake |
| 2012/0197743 | A1 | 8/2012 | Grigg |
| 2012/0239572 | A1 | 9/2012 | Wolfs |
| 2013/0041822 | A1* | 2/2013 | Wagner .................. G06Q 20/34 705/44 |
| 2013/0262317 | A1 | 10/2013 | Collinge et al. |
| 2013/0297425 | A1 | 11/2013 | Wallaja |
| 2014/0114857 | A1 | 4/2014 | Griggs |
| 2014/0165177 | A1 | 6/2014 | Alagha |
| 2014/0222545 | A1 | 8/2014 | Hajji |
| 2014/0365366 | A1 | 12/2014 | Spinella |
| 2015/0006380 | A1 | 1/2015 | Crews |

FOREIGN PATENT DOCUMENTS

| | | | | |
|---|---|---|---|---|
| WO | WO-0152170 | A1 * | 7/2001 | ......... G06Q 20/1085 |
| WO | 2013008041 | A1 | 1/2013 | |
| WO | 2013059098 | A1 | 4/2013 | |

OTHER PUBLICATIONS

Examination Reported dated Dec. 17, 2021 from UK Patent Office regarding corresponding GB application No. GB1419547.3.
Examination Report dated Feb. 5, 2021 from UK IPO regarding corresponding UK Patent Application No. 1419547.3.
Examination Reported dated Jul. 16, 2021; 7 pages; from related application GB 1419547.3.
Examination Reported dated Jan. 27, 2022 from UK Patent Office regarding corresponding GB application No. GB1419547.3.
Brazilian Search Report issued on May 13, 2020, which is enclosed, without translation, that issued in the corresponding Brazilian Patent Application No. BR112017009165-8.
Australian Search Report issued on May 28, 2020, which is enclosed, that issued in the corresponding Australian Patent Application No. 2015341557.
International Search Report of the corresponding International Application, PCT/GB2015/053292 dated Feb. 17, 2016, which is enclosed.
De Luca et al: "ColorPIN—Securing PIN Entry through indirect Input", CHI 2010: Input, Security, and Privacy Policies, Atlanta, GA, USA, Apr. 10-15, 2010 (Year: 2010).
Decision to Refuse dated Jan. 22, 2021 from the European Patent Office regarding corresponding EPO Patent Application No. 15790237.0.
Chinese Search Report issued on Apr. 14, 2020, which is enclosed, with translation, that issued in the corresponding Chinese Patent Application No. 201580070944.9.
Examination Reported dated Apr. 1, 2022 from UK Patent Office regarding corresponding GB application No. GB1419547.3.
Examination Reported dated May 5, 2022 from UK Patent Office regarding corresponding GB application No. GB1419547.3.

* cited by examiner

PIN ENTRY DEVICE WITH SECURE SURVEY FUNCTIONALITY

CROSS REFERENCE TO RELATED APPLICATIONS

This application is a continuation of application Ser. No. 15/523,845, filed May 2, 2017, which is a U.S. national stage of application No. PCT/GB2015/053292, filed on Nov. 2, 2015, the entire disclosures of which are hereby incorporated by reference. Priority under 35 U.S.C. § 119(a) and 35 U.S.C. § 365(b) is claimed from Great Britain Patent Application No. 1419547.3, filed on Nov. 3, 2014, the disclosure of which is also incorporated herein by reference.

FIELD OF THE INVENTION

The present invention relates to a PIN (Personal Identification Number) entry device and method having enhanced user I/O functionality while retaining strict security and certification framework of such devices.

BACKGROUND TO THE INVENTION

In the service industry, it is desirable for businesses to receive feedback from customers. Customer feedback may be used by a business to improve the service it offers. Historically, customer feedback was provided in person, by filling out a questionnaire. Alternatively, a business may ask a customer for feedback by emailing the customer after the service has been provided.

The Internet now enables customers to provide their feedback publicly. For example, online review websites enable customers to provide feedback on services such as hotel stays and restaurant dining. Such feedback may be used by the businesses being reviewed, to improve their service, or by the general public, to help make decisions about where to stay.

There is a problem with such feedback methods and review websites. Firstly, feedback is gathered after the event which is far less accurate than at the point of sale. Also, a very small percentage of customers actually engage in the feedback process, which means that results are never representative of the customer base. With review websites, the problem lies in that the credibility of the reviews provided by customers cannot be validated. The so-called 90-9-1 rule is said to apply to such websites. 90% of users view the reviews but never give any of their own. 9% give very infrequent or one-off reviews, and 1% provide regular reviews. The 1% who provide a review have a tendency to be particularly biased. There is also the problem of fake reviews (positive or negative) being given. There is therefore a need for feedback systems which encourage more accurate feedback from a greater number of customers.

The use of PIN Entry Devices (PEDs) as the preferred method of authorising EMV (Europay, Mastercard and Visa) card transactions is now commonplace in many countries. For example, in the UK and many other European countries, the favoured electronic Point of Sale (EPOS) method is Chip-and-PIN, where the PIN is verified using an IC chip on the card. Other techniques include online PIN verification which encrypts the PIN using keys accessed from the card and then sends it to the bank to be checked.

PED systems require the cardholder to enter their PIN into the PED device. The fact that the customer has to physically interact with a PED provides an opportunity to obtain other information from a customer. For example, it is known to ask a customer a question, using the PED about the service provided by the business which led to the transaction. For example, it is known to ask questions such as "Did the fruit look fresh today?", which require a "Yes/No" response. U.S. Pat. No. 8,510,193 (by Jade-I) proposes asking the user a question using the PED after they have completed their transaction. This has the disadvantage that after completing the transaction the user may be keen to allow other customers to pay for their goods, and causing them to dwell longer at the PED device slows down customer throughput. GB 2456346 (by Waterlow) proposes asking the user a question after they have entered their PIN but before the transaction completes, such as while the PED is waiting for approval of the payment from a remote payment server. This approach is also likely to have disadvantages in increasing a customer's dwell time. Other systems are only implemented within individual businesses on integrated systems.

It is also known to ask a customer to provide a charity donation by rounding the amount of their bill up to the nearest whole unit of currency, or to give a tip or gratuity to the customer service agent.

PEDs are manufactured and tested against a strict security and certification framework. A central component of this is the requirement to protect the cardholder's PIN from rogue exposure. A suite of rules governs the text that can be displayed, such as the questions, and the inputs that the user is able to make in response. PEDs have a keypad comprising numeric keys along with a number of function keys such as "Enter", "Cancel" and "Clear". The rules divide the text that can be displayed by the PED into approved text or unapproved text (also known as arbitrary text). User input using the numeric keypad is only permitted in response to approved text. The numeric keypad is normally disabled when unapproved text is displayed to prevent unauthorised PIN capture. The function keys (for example, "Enter", "Cancel" and "Clear") can be used in response to approved text and unapproved text. These rules mean that PIN entry is limited to a response to the text "Enter PIN" when it is genuinely requested by the IC chip on the card. Other approved text may include the charity donation or tip to the customer service agent, in which cases the entry is limited to a monetary value.

The set of rules prevents a hacker from commanding the device to display a message, such as "Enter PIN", in order to fraudulently have the user enter their PIN, which can then be output or stored for later use by the hacker.

U.S. Pat. No. 8,510,193, mentioned above, proposes asking the user a question by using unapproved or arbitrary text. In response the rules above only permit a user input from the function keys so the user may be required to press "Enter" to proceed. At the next screen approved text is displayed so the user can input a rating using the numeric input keys. The approved text would operate in a similar manner to the gratuity input set out above, and the display could be set to "Input rating" so that the user is instructed to provide a rating for the service, such as in answer to the question at the previous screen. This manner of operation has the disadvantage of the user having to go through two screens and inputs to provide the rating.

Alternatively, all of the questions could be approved such that the numeric keypad is activated to receive a response and the user can enter a rating immediately after the question is displayed. Since the questions are likely to be specific to the type of service vendor, a large number of vendor specific questions would be required. It is unlikely that approval would be obtained for such a number of questions because it may be considered to weaken the security of PED devices.

It is desirable to provide an improved PED and/or method of operating such a device that maintains strict security but that is capable of obtaining feedback from a user in response to a question.

SUMMARY OF THE INVENTION

According to a first aspect, the present invention resides in a PIN entry device, for example a PIN entry device used to settle financial payments, such as with a payment card. The PIN entry device may comprise an alphanumeric display for displaying text to a user and a numeric keypad. The numeric keypad may comprise ten buttons corresponding to the numbers 0 to 9, although other arrangements are possible. The PIN entry device may further comprise functions keys in addition to the numeric keypad, for example keys corresponding to "enter", "cancel" and "clear".

The PIN entry device is configured to operate to display text to the user on the alphanumeric display to prompt a response from the user, wherein the text corresponds to approved text and unapproved text. The approved text may correspond to text strings that have been given approval to be used on the PIN entry device in conjunction with the numeric keypad. For example, the PIN entry device may allow a response to be entered using the numeric keypad when approved text is displayed on the alphanumeric display. An example would be the approved text "Enter PIN", in which case the numeric keypad will accept entry of a PIN. The unapproved text may correspond to text strings that have not received approval to be used on the PIN entry device in conjunction with the numeric keypad. For example, the PIN entry device may allow a response to be entered only using function keys when unapproved text is displayed on the alphanumeric display. For example, unapproved text may correspond to "Add gratuity? Enter=yes, Cancel=no" in which case the "Enter" function key may be used to indicate a gratuity is to be added to the transaction amount. This may prompt the PIN entry device to display approved text such as "Enter amount" in which case the numeric keypad is rendered operable to allow the user to enter the amount of the gratuity.

It is advantageous to render the numeric keypad inoperable when unapproved text is displayed to avoid the fraudulent acquisition of a user's PIN. For example, a fraudster or hacker could configure a PIN entry device to collect a PIN by inserting an out of sequence question using unapproved text: this text may bear a request such as "PIN please". To prevent this, the PIN entry device does not allow use of the numeric keypad when unapproved text is displayed on the alphanumeric keypad.

The PIN entry device may be configured to accept the response upon the first key press. Preferably this would be a single numeric key entry. For example, the user may not need to press a function key such as the "enter" button after selecting one of the numeric keys. The PIN entry device may be configured such that once a response has been accepted, a further display of text is provided on the alphanumeric display. However, a time bar may be put in place before the further display of unapproved text, or before a response from the numeric keypad is accepted again. We will now describe these alternatives in turn.

Firstly, the time bar may be put in place before a further display of unapproved text may be provided. That is, the PIN entry device may be configured to display unapproved text, to accept a single key press response, and to display a second instance of unapproved text only after a time delay has expired. Optionally, the PIN entry device may be configured to allow a display of approved text at any time after a response to unapproved text has been entered. Hence, the time delay may not apply to displays of approved text.

The prevention of a sequence of displays of unapproved text provides further protection against fraudulent acquisition of a user's PIN. For example, a PIN device may be hacked or otherwise tampered with such that it displays a sequence of the same unapproved text such as "provide PIN". After each key press, the same question is redisplayed, but screen refresh times are such that the user will perceive just a single message that remains on the display through multiple key presses.

By creating a delay between successive displays of unapproved text, this potential misuse of the PIN entry device maybe avoided. Any time delay may be used, but time delays of over 5 seconds, over 10 seconds, over 30 seconds and a time delay of 30 seconds are preferred.

Alternatively, the time bar may be put in place after the second instance of the display of unapproved text and before the numeric keypad accepts a response to the second instance of unapproved text. In more detail, the PIN entry device may be configured to display unapproved text, to accept a single key press response and to display a second instance of unapproved text, and to accept a single key press response to the second instance of unapproved text only after a time delay has expired. Hence, a further display of unapproved text maybe provided, but any response may be rejected if entered before the time delay has expired. Optionally, an attempt to enter the second single key press response may cause an error code to be generated and/or may cause the attempt to be reported, for example to allow fraudulent use of the PIN entry device to be monitored. Any time delay may be used, but time delays of over 5 seconds, over 10 seconds, over 30 seconds and a time delay of 30 seconds are preferred.

The second instance of unapproved text may be a message not requiring an input from the user. For example, the message may be "Please wait" or "Thank you". Hence, it may be desirable that no key press is accepted in response to the second instance of unapproved text. The time bar therefore prevents acceptance of further input to the numeric keypad from the user.

The PIN entry device according to the present invention has advantages in that it permits a question to be asked to a user before the transaction completes, such as during time periods where the user is waiting for the payment process to commence. In this way the dwell time of the customer may be reduced compared to prior art methods that ask a question after the completion of a transaction.

The PIN entry device may comprise memory having stored therein computer program instructions that, when executed, cause the PIN entry device to operate as described above. Alternatively, the PIN entry device may be connected to a server across a network, and the server may be configured to cause the PIN entry device to operate as described above.

The PIN entry device may be used as a means for settling a financial transaction, for example in a store or restaurant. The PIN entry device may be a standalone device, for example such that it is connected only to a financial services provider to allow for the transaction to be completed. Alternatively, the PIN entry device may be connected to a point of sale (POS) system, for example to a till that may be provided with other devices such as a scanner, a printer and a cash drawer.

The PIN entry device may be configured to display on the alphanumeric display unapproved text corresponding to requests to provide customer ratings, such as relating to a product(s), goods or a service(s) they are purchasing. For example, text may be displayed to prompt the user to rate the service they received or the quality of the goods they purchased. The numeric keypad may be used to provide a rating between 0 to 9, where 0 may represent the worst value and 9 the best value. For example, 9 may be used to represent the very best service and 0 to represent the very worst service.

Accordingly the present invention provides a PIN entry device; a method of operating a PIN entry device; a computer program which, when executed, carries out the method of operating a PIN entry device; and one or more computer readable media comprising said computer program code.

The PIN entry device comprises an alphanumeric display for displaying text to a user, a numeric keypad and one or more function keys, and wherein the PIN entry device is configured to operate to display text to the user on the alphanumeric display to prompt a response from the user, wherein the text corresponds to approved text and unapproved text, and wherein the PIN entry device is configured to accept responses entered on the numeric keypad or one or more function keys in response to approved text, and to accept only a single key press response when prompted by a display of unapproved text.

The PIN entry device, configured to display unapproved text, may accept a single key press response and display a second instance of unapproved text only after a time delay has expired.

The PIN entry device, configured to display unapproved text, may accept a single key press response and display a second instance of unapproved text, and may accept a second single key press response to the second instance of unapproved text only after a time delay has expired.

The PIN entry device may be configured to generate an error code and/or report if a second one key response is made before the time delay has expired.

Alternatively, the PIN entry device, configured to display unapproved text, may accept a single key press response and may display a second instance of unapproved text only if the unapproved text of the second instance is different to the unapproved text of the first instance, such as if the display of the second instance of unapproved text is consecutive to the display of the first instance of unapproved text and accepting of the first key single key press response.

The method of operating a PIN entry device comprises: displaying text to the user on an alphanumeric display to prompt a response from the user, wherein the text corresponds to approved text and unapproved text; in response to a display of approved text accepting responses entered on a numeric keypad or one or more function keys, and in response to a display of unapproved text accepting only a single key press response entered on the numeric keypad.

BRIEF DESCRIPTION OF THE DRAWINGS

In order that the present invention may be more readily understood, preferred embodiments will now be described, by way of example only, with reference to the accompanying drawings in which.

DETAILED DESCRIPTION OF THE INVENTION

Figure 1:
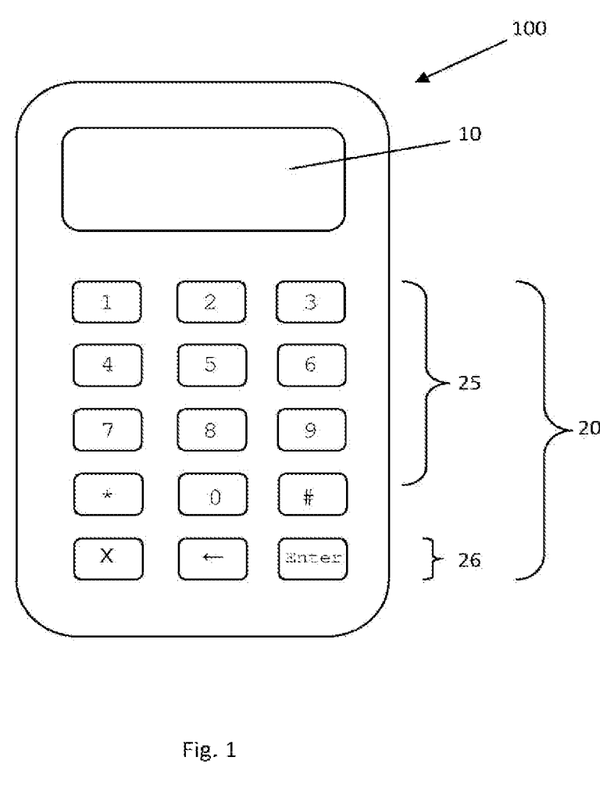
FIG. 1 is a schematic representation of a PIN entry device.

FIG. 1 is a schematic representation of a conventional PIN entry device (PED) 100 having an alphanumeric display screen 10 for displaying message text to a user, and a keypad 20 for user input. The keypad comprises a numeric keypad 25 having the numbers 0-9. A number of non-numeric keys may such as function keys 26 "Cancel", "Clear" and "Enter" are also provided. These may be indicated by symbols such as "X", "←" etc., as shown in FIG. 1. On some PED devices keys "*" and "#" may also be provided, as may be further function keys such as for example, F1, F2, F3 and F4. The non-numeric keys are non-secure keys, whereas the use of the numeric keys is strictly restricted so as to avoid a user being able to enter their PIN other than when requested by the IC chip.

The present invention implements a new input/output command for a PED to provide additional functionality which may be used to pose a question to user, such as a rating of a service, and the user to provide an input in response to the question.

The new command is used in combination with unapproved or arbitrary text and would preferably be implemented during the payment procedure such as during dead time in the processing of a transaction or before/after PIN entry but before completion of the transaction. For example, before the statement "Remove card" or the like is displayed. If the use of the new command is coupled with the transaction process, the command can be used to obtain reliable information such as rating information from the user on the service they have received. The rating information cannot be falsely provided from someone who has not received the service, and the information is not influenced by time passing between the service being received and the user providing the feedback.

In a first embodiment the new command receives and displays arbitrary text, and then waits for one key press from the user before returning with the value of that key press. The command may be known as "One arbitrary question, one key response" or abbreviated to "AQ1KR". Importantly the response is limited to a single key press. While it is possible that a rogue user could instruct the arbitrary text to be "Enter PIN", the command responds to only a single key press from the user. Since all PINs are more than a single key press and almost always consist of four key presses or more the user cannot be misled into entering his PIN because the command does not accept more than a single key press.

The command may be used to ask the user a question about the service they have received from the vendor. Example questions might include "Was the service friendly? Please rate from 0-9" or "Please rate the food from 0-9." The user would then be able to use the numeric part of the key pad to input a single response from 0-9 as a rating in answer to the question. An entry of "0" could be used to indicate a poor or the worst result, whereas a rating of "9" could be used to indicate that the service was the best possible.

The result of the question is collected and sent to a remote ratings server. The remote ratings server may be held by the ratings service provider to collate the results from the vendor or a range of the vendor's outlets or locations. The ratings service provider then provides feedback to the vendor on a regular basis which could be hourly, daily, and/or weekly etc. Alternatively, the results could be stored at a server provided by the vendor on his premises, such as in his store, the results collated locally and provided to the vendor. In some circumstances it may be desirable that the vendor is provided with real-time feedback in answer to the question.

The AQ1KR command permits the use of an arbitrary question. The questions may be provided from the remote ratings server of the ratings service provider. The question can be selected according to the type of service the vendor provides. For example, the questions asked at a restaurant might be related to the food and the service. At other types establishments the questions could be different. Some establishments might even be provided with multiple questions which can be selectively or randomly provided at the PED device when the AQ1KR command is invoked.

Figure 2:
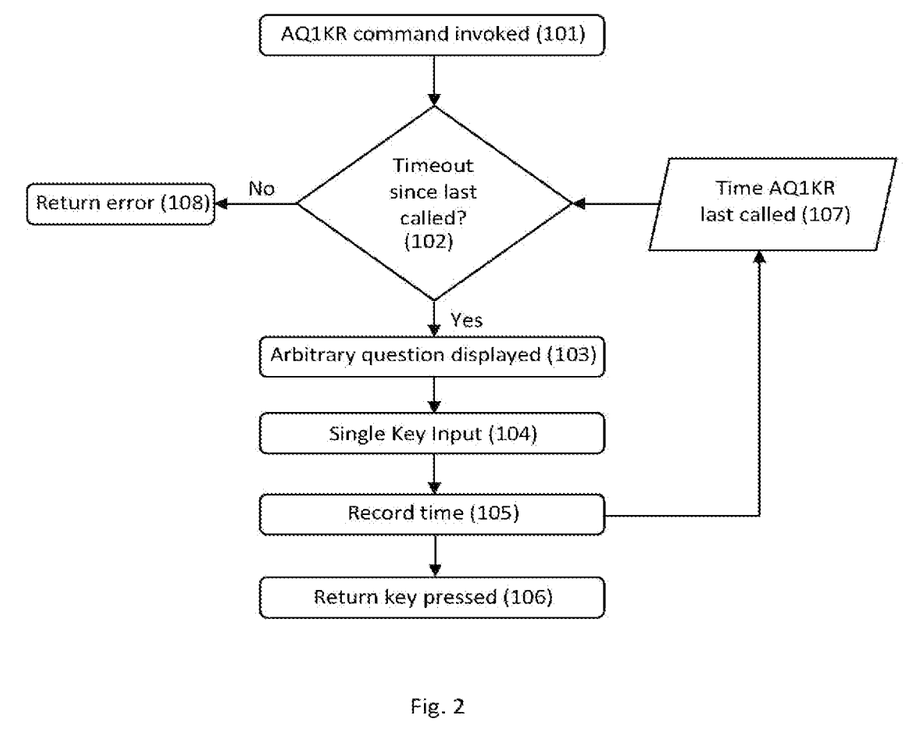
FIG. 2 is a flow chart showing instruction flow according to a first embodiment of the present invention.

FIG. 2 is a flow-chart showing additional security measures that would be implemented as part of the AQ1KR command. Despite the security measure of accepting only a single key press in response to the arbitrary question there remains the possibility of threat to a user's PIN from repeated asking of an arbitrary question. It would be possible for a rogue trader or hacker to string together repeats of the command having the identical text "Enter PIN". Each iteration of the command would permit a numeric input and hence multiple iterations would allow the hacker to build up the user's complete PIN. Since the arbitrary question text would be the same, the user would be unaware that he is actually answering multiple questions, but would expect that the "Enter PIN" question has genuinely been initiated by the IC chip on the card. To avoid this problem according to the first embodiment, the command immediately returns an error code if the command has been run within a preceding timeout period. The timeout period could for example be 30 seconds, 10 seconds, 5 seconds but is preferably set to a default value of 30 seconds.

The flow chart in FIG. 2 begins by invoking the AQ1KR command at step 101. The next step, 102, is to check to determine if the timeout period has elapsed since the last time the command was called. Alternatively, the timeout period could be from the last time a user input a response to the command. If the timeout period has not elapsed, the command returns an error code at 108. If the timeout period has elapsed the command continues to step 103 by displaying the arbitrary question. In response to the question, the user inputs a single key press at 104. The command records the time at which the single key press occurs at 105. The command has now completed but may be called again. If the command is called again the time at which the command was last invoked (or the time at which the user last provided an input to the command) is checked at step 107 to determine if the timeout has elapsed. Once again an error code is returned if the timeout period has not elapsed and as a result the arbitrary text is not displayed. If the timeout period has elapsed the command continues and displays the arbitrary text. The user may enter a second one key response.

At the end of the command it may be required that, for example, the "Enter" key is pressed to exit the AQ1KR command at step 106 and return the user's input, such as to the remote ratings server. The pressing of the "enter" also returns to the processing of the payment transaction. Alternatively, the AQ1KR command may return without requiring a press of a key additional to the numeric response.

In a related but alternative arrangement to the first embodiment the application of the delay or timeout in the second operation of the command could be applied before accepting a second one key response from the user instead of being applied before displaying the second instance of unapproved question. Hence, in this arrangement after the first instance of displaying the unapproved question, followed by the first one-key response, the AQ1KR command immediately proceeds to displaying the second instance unapproved question. At this point the delay or timeout is checked and implemented before accepting the second one-key response.

An advantage of using unapproved text for the question is that the questions can be tailored to be applicable to the services provided by the vendor. The manner in which the user responses are input (single key) maintains the security of the PED. The use of approved text for questions, such as in the prior art, is detrimental to the security of the PED and means that questions will likely not always fit with the vendor's services.

In a second embodiment the AQ1KR command is configured to be prevented from being run sequentially without a command involving either card removal or display of approved text occurring between consecutive occurrences of the command. This rule prevents a user from being repeatedly asked for their PIN through the use of the same or similar questions that a hacker could employ to obtain the PIN. For example, a hacker could use unapproved text "Enter PIN" as set out above and accept the first digit of the user's PIN as the single key press. If the hacker were allowed to repeat this unapproved text along with subsequent single key press entries the hacker could build up the PIN. The hacker need not use identical text but could for example use different text having the sequence ""Enter PIN *", "Enter PIN ", "Enter PIN *". The user would see these changes as natural feedback on their inputs.

Figure 3:
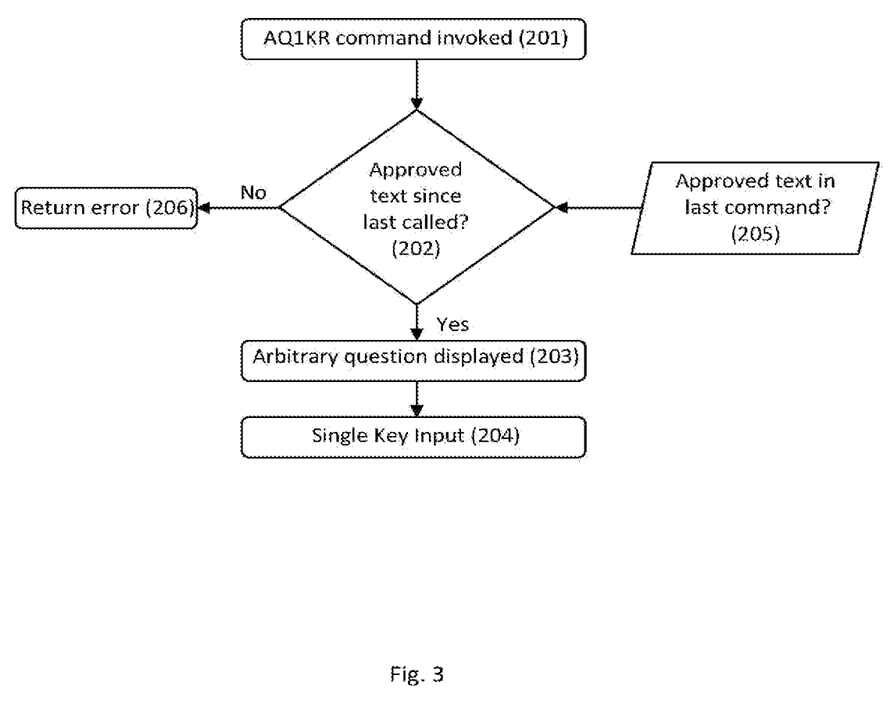
FIG. 3 is a flow chart showing instruction flow according to a second embodiment of the present invention.

The instruction flow for the second embodiment is shown in the flow-chart of FIG. 3. The figure shows the requirement for approved text to have been displayed between sequential operations of the AQ1KR command. A similar instruction flow would be used if the requirement for card removal between operations of the AQ1KR command was invoked. Returning to FIG. 3, the AQ1KR command is first invoked at step 201. Next, at step 202 a check is made to determine if approved text has been displayed since the last time the AQ1KR command was invoked. If no approved text has been displayed since the last time the command was invoked, the command returns an error as shown at step 206. If approved text has been displayed since the last time the command was invoked the command proceeds to display the unapproved or arbitrary text question, as shown at step 203. As discussed above in relation to the first embodiment, following the display of the arbitrary question, the command is configured to accept a single numeric key input. This input, shown at step 204 in FIG. 3, would correspond to the rating in relation to a question displayed as unapproved text.

As shown at step 205, to operate the function and the check at step 202 requires an input indicating whether approved text was displayed in the last command that was called.

Not shown in FIG. 3 is any requirement for the "Enter" key to be pressed to complete the function, but this is an option that may be included as for the first embodiment and shown in FIG. 2.

The alternative of requiring a card removal command to have occurred between sequential operations of the AQ1KR would replace step 202 with a check of whether certain specific commands had been run. It is possible that both the checks for card removal/insertion commands and a display of approved text could both be performed.

Aspects of the first and second embodiments may be combined. For example, the checks in the second embodiment prevent the AQ1KR command from being run sequentially without generating an error (or the resulting input being ignored). When the command is called and permitted to run, the elapsed time since it was last called is checked as per the first embodiment. We have described the above embodiments in relation to PED devices where the payment card is a Chip-and-PIN card which is inserted into a slot in the PED. However, the embodiments are equally applicable for use with contactless card payments, or cards that use PINs stored on magnetic strips.

Those skilled in the art will appreciate that variations may be made to the above embodiments without departing from the scope of the invention that is defined by the appended claims. Although the ten numeric buttons 0 to 9 are proposed for providing the user input, such as a rating, fewer or more buttons could be provided. For example, fewer than ten to represent a smaller range, such as 1 to 5, could be provided.

What is claimed is:

1. Apparatus for settling financial payments, the apparatus configured to receive one or more inputs from a user, the apparatus comprising:
   at least one display for displaying text to a user, and,
   a processor executing computer instructions or circuitry that cause the apparatus to perform the steps of:
      receiving and processing a trigger to start a financial transaction;
      starting a ratings process, comprising calling a ratings server and receiving at least one response from the ratings server, the at least one response specifying unapproved text to be displayed on the at least one display to the user;
      displaying the unapproved text to the user on a display screen, the unapproved text requesting one or more inputs from the user, and on displaying the unapproved text, configuring the apparatus to read a single key input response as input data from user's one or more inputs in response to the unapproved text, and to ignore or disable further one or more inputs from the user following the single key input response;
      receiving a key input response through a user interface, wherein the key input response comprises at least one key input from the user, reading and processing a single key input response as input data received through the user interface in case of a user response to the unapproved text, and sending the single key input response as input data to the ratings server or other server;
      displaying an approved text to the user on the display screen, the approved text being a request for the user to provide one or more inputs through the user interface for proceeding with the financial transaction; and
      receiving and processing through the user interface, the one or more inputs from the user, for proceeding with the financial transaction, wherein the one or more inputs authorizes the financial transaction to proceed.

2. The apparatus of claim 1, wherein after displaying the approved text to the user, the apparatus is configured to read the one or more inputs for processing the financial transaction that comprises multiple key inputs from the user.

3. The apparatus of claim 1, wherein the one or more inputs that authorizes the financial transaction to proceed comprises a PIN entered by the user.

4. The apparatus of claim 1, wherein after displaying the unapproved text and reading the single key input response, the apparatus further displays a second instance of unapproved text after a time delay has expired.

5. The apparatus of claim 4, configured to generate an error code or report when the second single key input response is made before the time delay has expired.

6. The apparatus of claim 1, wherein after displaying the unapproved text and reading the single key input response, the apparatus further displays a second instance of unapproved text if the second unapproved text differs from the displayed unapproved text.

7. The apparatus of claim 1, wherein after displaying the unapproved text, and reading the single key input response, the apparatus displays a second instance of unapproved text, and reads a second single key input response to the displayed second instance of unapproved text after an expiration of a time delay.

8. The device apparatus of claim 7, wherein the time delay comprises one of over 5 seconds, over 10 seconds, over 30 seconds and 30 seconds.

9. The apparatus of claim 1, wherein the display of unapproved text is display of a first instance of unapproved text, and the apparatus is further configured to display a second instance of unapproved text in the event that a one or more approved text was displayed after displaying the first instance of unapproved text.

10. The apparatus of claim 1, wherein the display of unapproved text is display of a first instance of unapproved text, and the apparatus is further configured to display a second instance of unapproved text in the event that a payment card insertion state has changed between being inserted and removed after the first instance of unapproved text was displayed.

11. The apparatus of claim 1, wherein the unapproved text is a question to the user and the unapproved text is displayed to the user before a payment transaction completes.

12. The apparatus of claim 1, wherein the determining whether the displayed text is a part of the financial transaction comprises comparing the displayed text to a text in computer memory, pre-approved by a financial payment service provider or the apparatus manufacturer, and, if matching, determining to permit a multi-key response to the displayed text.

13. A method for settling financial payments and receiving one or more inputs from a user of an electronic apparatus through a user interface, the method comprising:
   receiving and processing by a processor on the electronic apparatus a trigger to start a financial transaction;
   starting a ratings process, comprising calling a ratings server and receiving at least one response from the ratings server, the at least one response specifying unapproved text to be displayed on at least one display to a user;
   displaying the unapproved text to the user on a display screen, the unapproved text requesting one or more inputs from the user, and on displaying the unapproved text, configuring the input interface to read a single key input response as input data from user's one or more inputs in response to the unapproved text, and to ignore or disable further one or more inputs from the user following the single key input response;
   receiving a key input response through the user interface, wherein the key input response comprises at least one key input from the user, and reading and processing a single key input response as input data in case of a user response to the unapproved text, and sending the single key input response as input data to the ratings server or other server;

displaying an approved text to the user on the display screen, the approved text being a request for the user to provide one or more inputs for proceeding with the financial transaction; and receiving and processing by the user interface the one or more inputs from the user, for proceeding with the financial transaction, wherein the one or more inputs authorizes the financial transaction to proceed.

14. The method of claim 13, wherein after displaying the approved text to the user, performing the step of reading multiple key inputs from the user for processing the financial transaction.

15. The method of claim 13, wherein the authorizing the financial transaction to proceed comprises receiving and processing a PIN entered by the user.

16. The method of claim 13, wherein after displaying the unapproved text and reading the single key input response, the method comprises displaying a second instance of unapproved text after an expiration of a time delay.

17. The method of claim 16, further comprising generating an error code or report when the second single key input response is made before the time delay has expired.

18. The method of claim 13, wherein after displaying the unapproved text and reading the single key input response, the method further comprises displaying a second instance of unapproved text if the second unapproved text differs from the displayed unapproved text.

19. The method of claim 13, wherein after displaying the unapproved text, and reading the single key input response, the method further comprises displaying a second instance of unapproved text, and reading a second single key input response to the displayed second instance of unapproved text after a time delay has expired.

20. The method of claim 19, wherein the time delay comprises one of over 5 seconds, over 10 seconds, over 30 seconds and 30 seconds.

21. The method of claim 13, wherein the displaying of unapproved text is displaying a first instance of unapproved text, and the method further comprises displaying a second instance of unapproved text in the event that a one or more approved text was displayed after displaying the first instance of unapproved text.

22. The method of claim 13, wherein the displaying of unapproved text is displaying a first instance of unapproved text, and the method further comprises displaying a second instance of unapproved text in the event that a payment card insertion state has changed between being inserted and removed after the first instance of unapproved text was displayed.

23. The method of claim 13, wherein the unapproved text is a question to the user and displaying the unapproved text to the user before a payment transaction completes.

24. The method of claim 13, wherein the determining whether the displayed text is the one or more inputs for proceeding with the financial transaction comprises evaluating a criteria or rules set by a financial payment service provider or the device manufacturer.

25. A non-transitory computer-readable storage media having instructions stored thereon that, when executed on a processor, perform the method steps of:

receiving and processing a trigger to start a financial transaction;

starting a ratings process, comprising calling a ratings server and receiving at least one response from the ratings server, the at least one response specifying unapproved text to be displayed on at least one display to a user;

displaying the unapproved text to the user, the unapproved text requesting one or more inputs from the user, and on displaying the unapproved text, configuring to read a single key input response as input data from user's one or more inputs in response to the unapproved text, and to ignore or disable further one or more inputs from the user following the single key input response;

receiving a key input response through a user interface, wherein the key input response comprises at least one key input from the user, and reading and processing a single key input response as input data in case of a user response to the unapproved text, and sending the single key input response as input data to the ratings server or other server;

displaying an approved text to the user, the approved text being a request for the user to provide one or more inputs for proceeding with the financial transaction; and receiving the input from the user through the user interface, for proceeding with the financial transaction, wherein the one or more inputs authorizes the financial transaction to proceed.

* * * * *